United States Patent Office 3,473,308
Patented Oct. 21, 1969

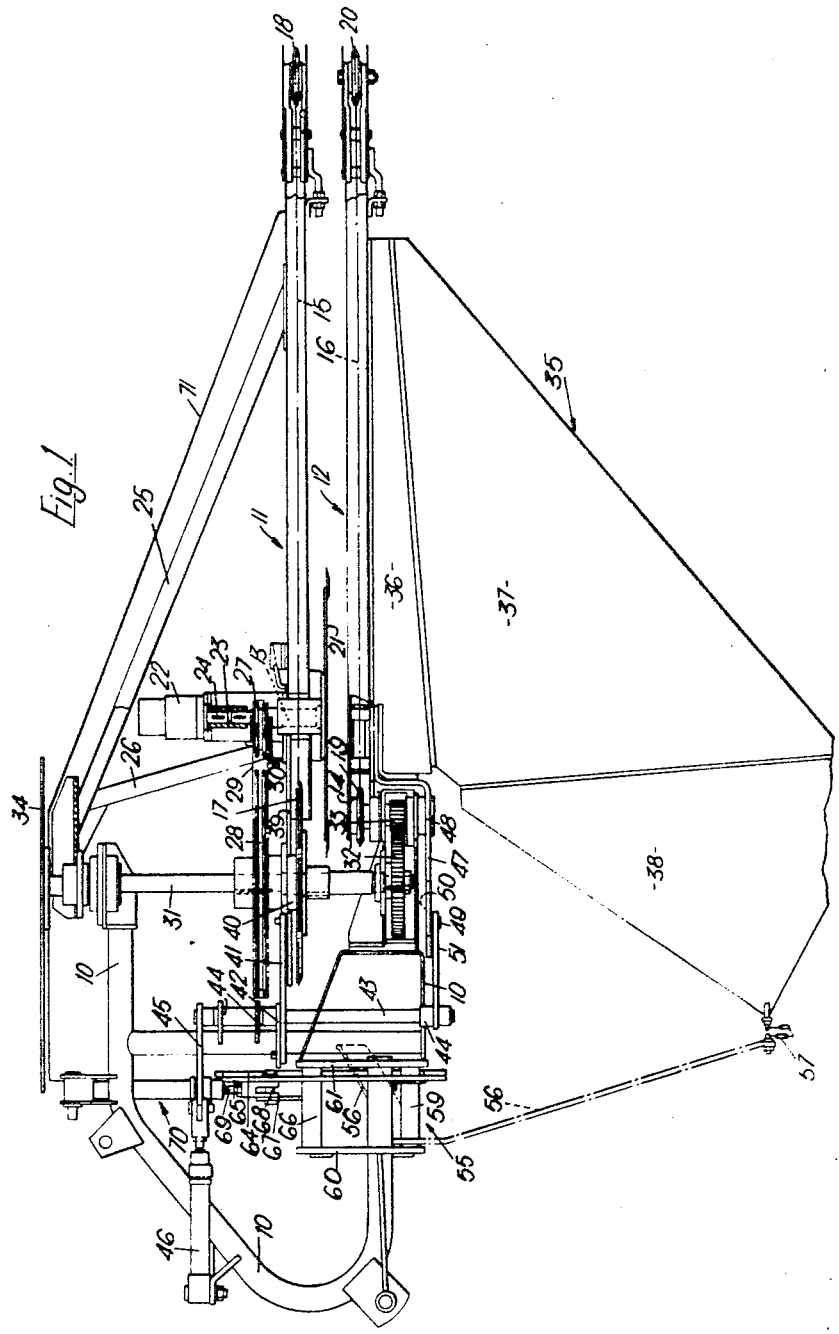

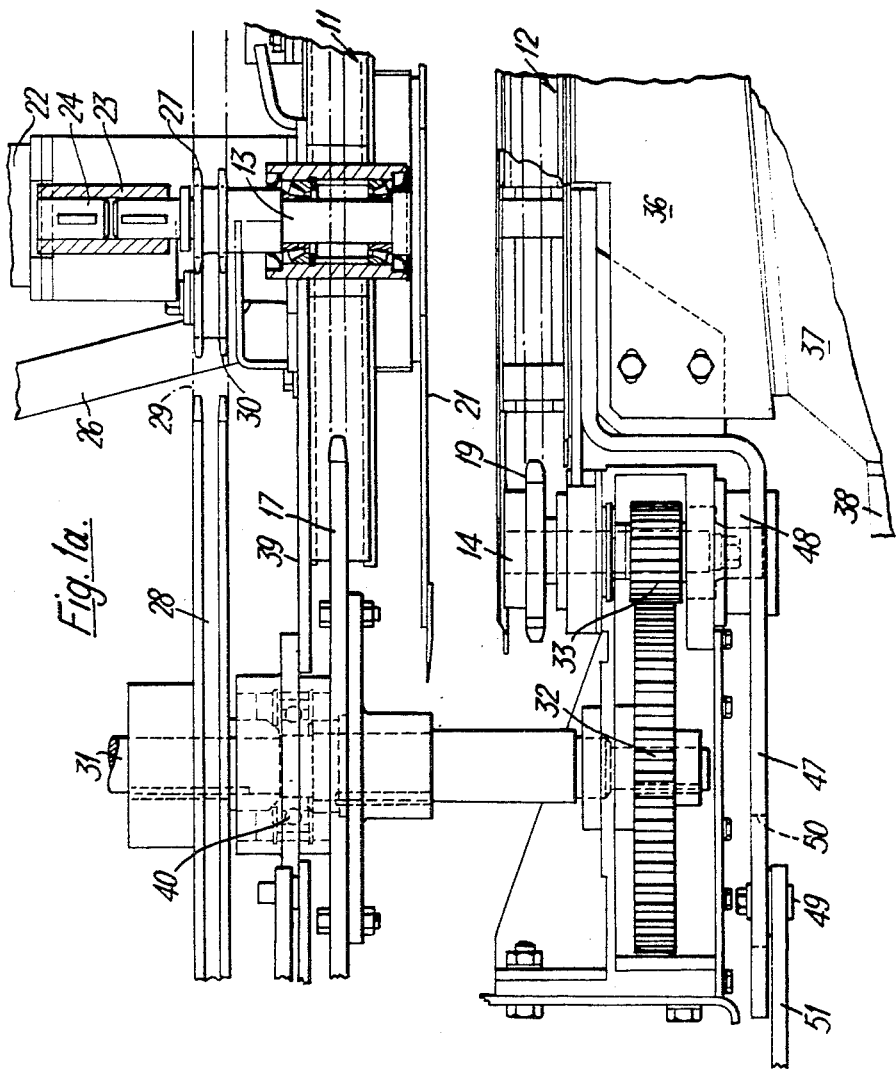

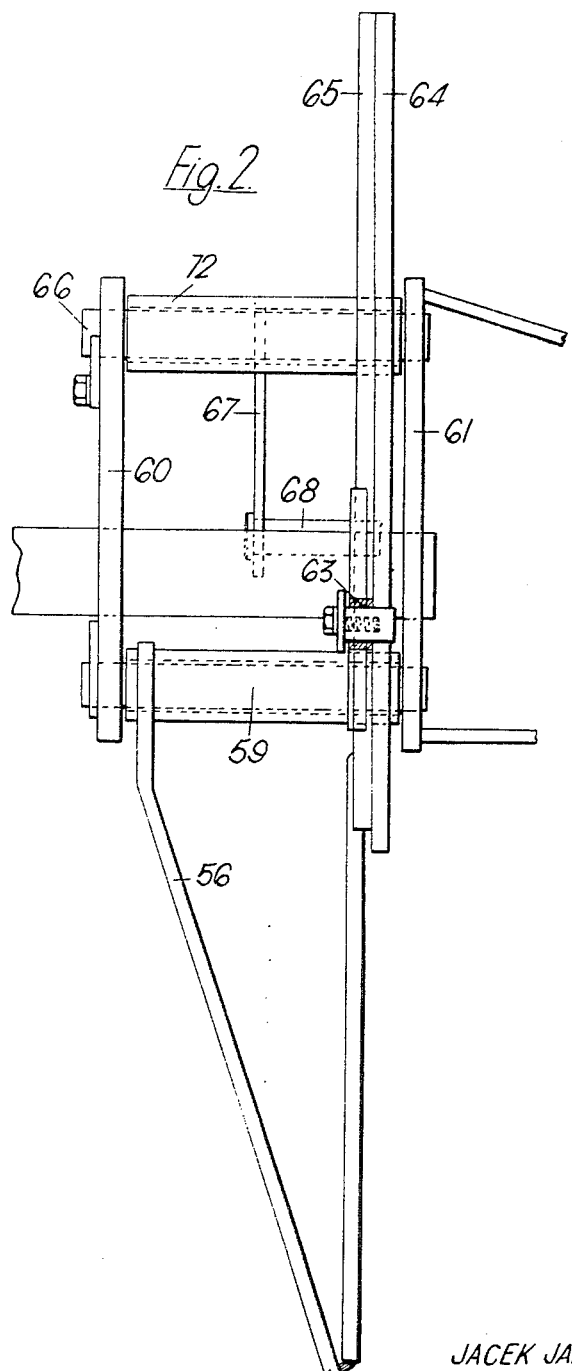

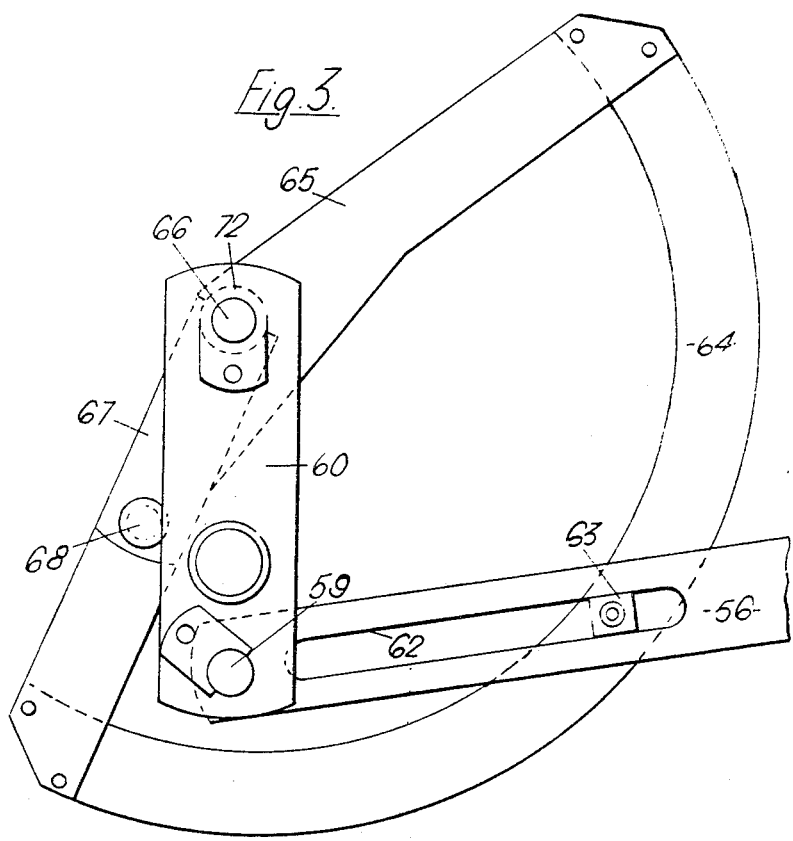

3,473,308
REVERSIBLE TOPPER FOR CANE HARVESTER
Jacek Januariusz Zagorski, Balwyn, Victoria, and Ernest Walter Wright, Garden City, Melbourne, Australia, assignors to Massey-Ferguson (Australia) Limited, Sunshine, Victoria, Australia
Filed June 1, 1967, Ser. No. 642,844
Claims priority, application Great Britain, June 10, 1966, 25,870/66
Int. Cl. A01d 45/10
U.S. Cl. 56—63
9 Claims

ABSTRACT OF THE DISCLOSURE

A crop cutting deflecting apparatus for a tall crop harvester having a pair of pivoted divergent gathering arms for guiding the crop into a rotary cutter. The arms can be simultaneously swung from one side to the other, the cutter direction reversed and a deflector plate swung—all to allow cutting and deflecting operation on either side of the harvester.

---

Machines for harvesting tall crops such as sugar cane generally include a topping apparatus which projects forward of the machine and which gathers, cuts and deflects the tops of the crop to one side of the machine. More modern machines such as that shown in application S.N. 401,604, "Harvester for Tall Row Crops," filed Oct. 5, 1964, provide a topping apparatus having a reversible direction of throw. The present invention is concerned with such a topper and, in particular, uses a pair of hydraulic cylinders and a pair of rotary fluid motors for controlling the topper.

In general, the topping apparatus includes a pair of gathering arms which have chains thereon which are operated by a first hydraulic motor. These arms feed the crop towards the throat of the topper in which is located a rotary cutter driven by a second hydraulic motor. A first hydraulically actuated linkage can cause simultaneous swinging of the two gathering arms from one side to the other so as to engage the standing cane on either side of the machine. A deflector plate, which is swung through an arc of over 180°, is actuated by a novel second linkage having a hydraulic cylinder as its power source. By proper operation of the arms, cutter, and deflector, the topper mechanism will permit use of the harvester in an up and down operation in the field.

An embodiment of the invention will now be described, by way of example only, with reference to the accompanying drawings, in which:

FIGURE 1 is a sectional elevation of a top cutting device;

FIGURE 2 is an enlarged view of a linkage shown in FIGURE 1;

FIGURE 3 is an end view of the linkage of FIGURE 2; and

Figure 4:
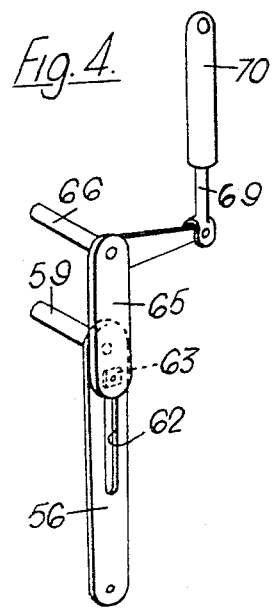
FIGURES 4 to 6 are diagrammatic views of a simplified form of linkage similar to that shown in FIGURES 2 and 3.

Referring to the drawings, the top cutting device of FIGURE 1 is adapted to be carried by a sugar cane harvester at a high level and so as to project ahead of the harvester as it travels along rows of cane. The device has a frame 10 adapted for connection to a boom extending forwardly from the cane harvester.

A pair of forwardly diverging gathering arms 11 and 12 are respectively pivotally mounted about shafts 31 and 14 supported on the frame 10 and are provided with chains 15 and 16 having fingers (not shown) which project from the chains into the throat formed by the diverging arms. The upper chain 15 is entrained round driving and driven sprockets 17 and 18 respectively and the lower chain 16 is entrained round driving and driven sprockets 19 and 20 respectively. In operation the chains are driven such that the inner runs of both chains converge towards the throat.

A rotary cutter 21 is mounted on a shaft 13 and is drivingly connected to a hydraulic motor 22 through a sleeve connection 23 which couples the motor output shaft 24 to the upper end of the shaft 13. The cutter is located in a plane between the upper and lower arms 11 and 12 and in operation cuts the tops off the canes which are drawn into the throat by the fingers on the chains 15 and 16. The opposite ends of the upper arm 11 are supported by ties 25 and 26 supported on, but pivotal realtive to, the frame 10. A shrould 71 acts to deflect tops towards the cutter 21.

The chains 15 and 16 are driven in unison in opposite directions by the motor 22. For this purpose a sprocket 27 is secured to the shaft 13 and drives a sprocket 28 through a chain 29. An adjustable tensioner 30 is provided to compensate for slackness in the chain. The sprocket 28 is keyed to the shaft 31 to which the driving sprocket 17 of the upper chain 15 is also keyed. The driving sprocket 19 of the lower chain 16 is driven from the shaft 31 through meshing gears 32 and 33 keyed to the shafts 31 and 14 respectively.

A rotary flinger 34 is mounted at the upper end of the shaft 31 and in operation knocks the tops cut by the cutter 21 to one side of the device from whence they are guided clear of the machine by a deflector plate 35. The latter is connected to the lower arm 12 and consists of three hinged parts 36, 37, 38 which enable the deflector to be adjusted so as to deflect tops to either side of the device as will be described.

In harvesting cane the harvester will normally traverse the field in one direction and then in the other, so that both sides of the machine are alternately adjacent the unharvested crop. For effective operation the uppermost arm 11 must be adjacent the unharvested crop and the deflector plate 35 must direct cut tops to the side of the machine farthest from the unharvested crop.

To enable the upper arm 11 to be presented to the crop at all times, the arms 11 and 12 are pivotable about the shafts 31 and 14. For this purpose a rearward extension 39 of the upper arm 11 is pivotally connected to a link 41 pivoted to a crank 42 on a spindle 43 carried in bearing brackets 44 on the frame 10. The spindle 43 is rotatable by a lever 45 pivoted to a hydraulic ram 46. In the case of the lower arm 12, a rearward extension 47 of the arm is pivoted about a bush 48 co-axial with the shaft 14 and is connected by a pin and slot connection 49, 50 to a link 51 rotatable with the spindle 43.

Thus to swing the arms 11, 12 between their alternative positions of use, the ram 46 is extended or contracted, thus rotating the spindle 43 through the lever 45; the crank 42 and link 41 cause rotation of the arm 11, together with the motor 22 and ties 25 and 26, in one direction, and the link 51 causes rotation of the arm 12 in the opposite direction. Thus the arms cross one another, and, when viewed in plan, effectively change positions. This brings the lower arm 12 to the opposite side of the machine. To restore the arms 11 and 12 to their original positions the ram 46 is operated in reverse i.e., is contracted if it was originally extended or vice-versa. In FIGURE 1 the ram is shown contracted.

However, when the arms 11 and 12 are crossed over, the direction of rotation of the chains 15 and 16 must be reversed so that the inner runs again move towards the throat, and so also must the direction of rotation of the flingers 34 be reversed so that it deflects cut tops away from the unharvested crop. For this purpose the liquid connections to the motor 22 are reversed thus reversing the directions of rotation of the chains 15 and 16, the flinger 34 and also the cutter 21. Reversal of the latter is desirable as it assists in correct deflection of the cut tops.

To ensure effective discharge of the cut tops the deflector plate 35 must also be adjusted to guide the tops clear of the opposite side of the machine, and for this purpose a special linkage is provided. This linkage is indicated generally at 55 in FIGURE 1 and is shown in detail FIGURES 2 and 3.

The linkage includes an actuating lever 56 connected by a short chain 57 (FIGURE 1) to the section 38 of the deflector plate 35. The lever 56 is pivoted at one end on a pin 59 carried between brackets 60 and 61 secured to the frame 10. A slot 62 is formed in the lever 56 radially to the axis of the pin 59, and this slot is engaged by a slide block 63 pivoted on a curved lever 64 joining the ends of a two-armed secondary lever 65. The latter is fixed to a boss 72 which is pivotal about a pin 66 located vertically above the pin 59 and carried between the brackets 60 and 61. A lug 67 is carried by the boss 72 and a further pin 68 extends between the lug 67 and the secondary lever 65 and is connected to the piston rod 69 of a hydraulic ram 70 the cylinder of which is pivotally connected to the frame 10.

The nature of this linkage is such that any movement imparted to the secondary lever 65 by the ram 70 is reflected in an increased angular movement of the actuating lever 56. In operation, to move the deflector plate 35 from one side to the other, the actuating lever 56 must swing through an angle of more than 180°, and the above-described linkage enables this to be effected though the movement of the secondary lever 65 by the ram 70 is less than 180°. The edges of the slot 62 are chamfered so that trapped cane will be cut off and not block the slot.

Thus to change from one operating position to the other, the ram 46 is operated, thus swinging the arms 11 and 12 to opposite sides simultaneously, the motor 22 is reversed, thus changing the direction of rotation of the chains 15 and 16, the cutter 21 and the flinger 34, and the ram 70 is operated to move the deflector plate 35 from one side to the other. The harvester is then ready to cut cane at the opposite side. Operation of the rams 46 and 70 and reversal of the motor 22 may be effected simultaneously or sequentially. In a modification the arms 11 and 12 may pivot about a common axis.

Figure 5:
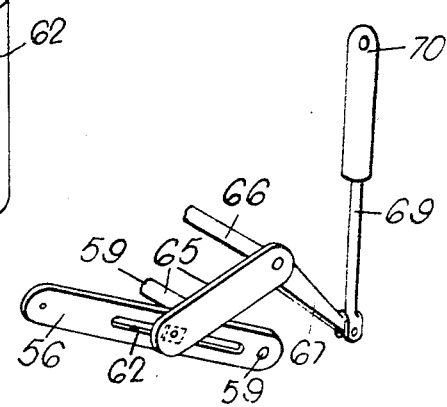
Figure 6:
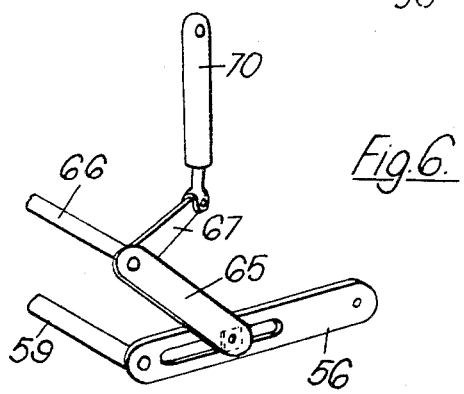

The linkage 55 may be used in other applications where more than 180° movement is required by operation of a hydraulic ram or air cylinder. FIGURES 4 to 6 show a simplified embodiment of the linkage and the parts have been referenced the same as in FIGURES 2 and 3. FIGURE 4 shows the levers in one extreme position, FIGURE 5 in midway position and FIGURE 6 in the other extreme position. It can be clearly seen that the lever 56 moves through more than 180° while the lever 65 does not. Thus the linkage enables more than 180° of movement to be obtained by operation of the ram 70. In a modification the sliding block 63 may be replaced by a roller.

We claim:
1. A top cutting device adapted to be mounted at an upper forward location on a machine for harvesting tall crops, including a pair of gathering arms diverging forwardly from a narrow throat and disposed one above the other, a rotary cutter located in said throat, each arm being mounted on a substantially vertical pivot axis and being connected to means for pivoting same about the associated axis so that the positions of the arms may be interchanged.

2. A device according to claim 1 in which both said arms are connected to a common linkage which effects simultaneous pivoting of both arms.

3. A device according to claim 1 in which said arms carry endless chains fitted with crop-engaging fingers and adapted to be driven so that the inner runs move towards said throat, there being means for reversing the direction of travel of said chains when said arms are interchanged.

4. A device according to claim 1 including a rotary flinger adapted to throw tops cut by said cutter to one side of the device, and means for reversing the direction of rotation of said flinger when said arms are interchanged.

5. A device according to claim 1 including means for reversing the direction of rotation of said cutter.

6. A device according to claim 1 in which said chains, cutter and flinger are all driven from a common reversible motor.

7. A device according to claim 1 in which a deflector plate is provided to guide cut tops to one side of the device, there being means for moving the deflector plate from one side of the device to the other when said arms are interchanged.

8. A device according to claim 7 in which said means for moving the deflector plate is a linkage including a primary lever pivotally mounted about a first axis at one end of the lever and connected at its other end to said deflector plate, there being a slot substanitally on the center line of said primary lever and extending radially of said axis, and a secondary lever pivotally mounted about a second axis parallel to said first axis and having a sliding connection with the slot in said primary lever, and a hydraulic ram connected to said secondary lever for effecting angular movement thereof about said second axis to thereby effect increased angular movement of said primary lever and deflector plate.

9. A device according to claim 8 in which said secondary lever is a bell-crank lever pivoted intermediate its ends about said second axis, there being a curved lever joining the opposite ends of said bellcrank lever and carrying a slide block engaged with the slot in said primary lever.

References Cited

FOREIGN PATENTS 972,578   10/1964   Great Britain.

ROBERT PESHOCK, Primary Examiner

JAMES W. MITCHELL, Assistant Examiner